Sept. 18, 1951 T. W. BURNAM ET AL 2,568,429

DISTRIBUTOR HEAD

Filed Oct. 19, 1945 5 Sheets-Sheet 1

Inventors

Thompson W. Burnam
George D. Ramsay

By Lyon & Lyon Attorneys

Sept. 18, 1951 T. W. BURNAM ET AL 2,568,429

DISTRIBUTOR HEAD

Filed Oct. 19, 1945 5 Sheets-Sheet 2

Inventors
Thompson W. Burnam
George W. Ramsay

By Lyon & Lyon Attorneys

DISTRIBUTOR HEAD

Inventors
Thompson W. Burnam
George D. Ramsay

By Lyon & Lyon Attorneys

Sept. 18, 1951 T. W. BURNAM ET AL 2,568,429

DISTRIBUTOR HEAD

Filed Oct. 19, 1945 5 Sheets-Sheet 4

Inventors
Thompson W. Burnam
George D. Ramsay

By Lyon & Lyon

Attorneys

Sept. 18, 1951 — T. W. BURNAM ET AL — 2,568,429

DISTRIBUTOR HEAD

Filed Oct. 19, 1945 — 5 Sheets-Sheet 5

Inventors
Thompson W. Burnam
George D. Ramsay

By Lyon & Lyon
Attorneys

Patented Sept. 18, 1951 2,568,429

UNITED STATES PATENT OFFICE 2,568,429

DISTRIBUTOR HEAD

Thompson W. Burnam, Whittier, and George D. Ramsay, San Marino, Calif., assignors, by direct and mesne assignments, to Fog Nozzle Company, Los Angeles, Calif., a limited partnership Application October 19, 1945, Serial No. 623,310

6 Claims. (Cl. 299—125)

This invention relates to a distributor head of the type employed for producing a water or other liquid spray or fog in fire-extinguishing operations. While not necessarily confined thereto, the distributor heads of the present invention are particularly useful as part of a stationary fire-extinguishing installation.

Heretofore, as distributor heads are conventionally designed, the ports or orifices of the heads through which the water or other fire-extinguishing fluid is to emerge, are open to gas fumes, dust, etc., in the space surrounding the installation, and as a result the conventional distributor heads are subject to stoppage by fumes or dirt. Moreover, as conventionally designed, distributing heads on fire-extinguishing installations have a certain fixed relation of their orifices or ports through which the fluid is to emerge which adapts each particular distributor head for efficient operation only at a certain range of fluid pressure. If, in certain cases, the fluid pressure behind the distributor head falls below the range of efficient operation of the head, the head is no longer an adequate fire protection means. Loss of fluid pressure to a distributor head may arise from various causes, without always affording any notice of the inadequacy of the installation.

It is the general object of the present invention to provide distributor heads in which the orifices or ports through which the fluid is to emerge are arranged in relatively movable parts or members. These parts or members are movable from closed to open, or operating, position entirely responsive to the application to the distributor heads of an operating fluid pressure. In the closed position of such parts the ports or orifices of the distributor heads are protected from being affected by steam, dust, etc., in the space surrounding the heads so that while the distributor heads are standing in inoperative position no deterioration or plugging of the ports or orifices may occur. The relatively movable parts are movable on the application of the fluid pressure to the operating position where the desired spray or fog is created by the head. In certain, at least, of the distributor heads of the present invention, means are provided by which the relation of the ports and orifices vary in accordance with the operating pressures of the fluid on the distributor head so as to extend the range of efficient operation of the device.

More particularly, in the distributor heads of the present invention, distributor heads are provided with two or more chambers located back of the orifices or ports from which the fluid is to emerge and means are provided for transmission of fluid one chamber to another, which means permits a relative axial movement between the chambers so that the chambers are relatively movable, and the relative movement of the chambers varies in accordance with the fluid pressure applied. In this way the distributor heads of the present invention automatically compensate for varying fluid pressures and are movable throughout a wide range of fluid pressures to produce an efficient spray or fog for extinguishing fires.

In certain forms of the present invention at least, the distributor heads are provided with a multiplicity of passages, ports or orifices through which the fire-extinguishing fluid may emerge and the means provided for relatively moving the chambers of the head are arranged to expose varying numbers of such ports or orifices, or a varying area of ports or orifices, for the discharge of the fluid in such manner as to vary the volume of the emerging fluid in accordance with the fluid pressure, and to thereby maintain the relationship of the orifices or nozzles relative to the actuating fluid pressure such as to effect efficient fog generation.

While one of the major purposes of the present invention is to provide distributor heads particularly useful for fire protection service in fixed installations, many of the principles of the present invention may be utilized in distributor heads of the portable type attached to flexible hoses or pipe extensions, or the heads may find utility in other fields than fire protection.

Another object of the present invention is to improve the design and arrangement of the ports and orifices of a spray head.

Another object of the present invention is to provide distributor heads having various resilient means for closing the heads, some of which are actuated by spring-actuated means and some by rubber or other resilient type material.

Another object of the present invention is to combine with the distributor heads of the automatic opening and closing type heretofore described, certain means such as fusible links, fusible bands, etc., for automatically initiating the application of the fluid pressure to the heads for opening the same.

Another feature of the present invention is to provide distributor heads including novel slotted type ports for forming the fog or spray to provide double spring-actuating means and under certain conditions to provide weight-actuated closing devices.

The distributor heads of the present invention, together with a number of other advantages and objects, will be more fully explained in connection with the following description given of a number of preferred forms or examples of distributor heads embodying the invention. For that purpose the preferred forms of the present invention, together with various modifications, are described with reference to the accompanying drawings, in which Figure 1 is an elevation, mainly in vertical section, of one form of distributor head embodying the invention, the distributor head being shown in the closed position.

Figure 1:
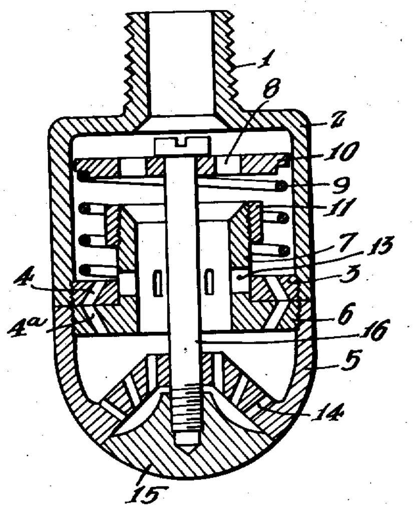
Figure 2:
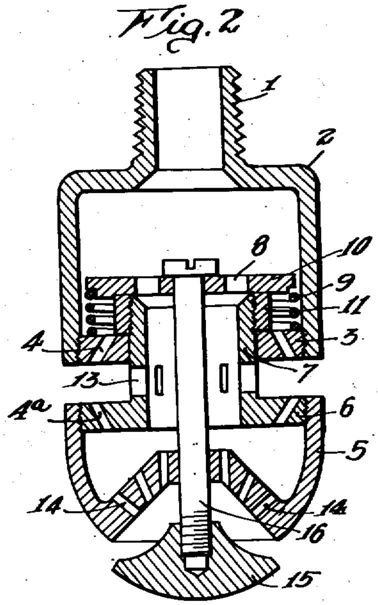
Figure 2 is a similar view, showing the distributor head in an open position.

Referring, first, to Figures 1 and 2 of the drawings, the distributor head embodies an upper member 2 which may be provided with a threaded portion 1 by means of which the distributor head may be attached to any suitable source of fluid supply. The upper member 2 is of general hollow, cylindrical shape and at its lower end is threaded as indicated to an orifice plate 3. The orifice plate 3 is perforated with a plurality of ports or orifices 4, usually circular in cross-section and placed at any usual or desired angle. The head also includes a lower member 5 which is also hollow and roughly hemispherical in shape. At the upper end of the lower member is an orifice plate 6 and through the orifice plate 6 are provided a plurality of slots or ports 4*a* of any suitable cross-section for the emergence of the fluid. The orifices 4 and 4*a* are arranged in their respective plates so that the fluid streams emerging therefrom will impinge against each other. The impingement of the fluid streams in the operation of the device causes the fluid to be broken up into a spray or fog which emerges from the device. The angle of the orifices 4 and 4*a* determine the extent of the projection of the resulting fog from the distributor head. When the streams emerge nearly perpendicular the extent of coverage by the spray head is less than where the streams impinge at less angles; the angles of the orifices thereby enable the design of the head to meet existing conditions in accordance with the wellknown practice in the are of designing distributor heads operating under the impinging principle.

The orifice plate 6 is formed on an annular tube 7 which extends upwardly into the upper member 2 of the head. The orifice plate 3 has a sliding fit on the tube 7 which serves to maintain the upper and lower members 2, 5 of the head in axial alignment, but allows relative axial movement therebetween.

A coil spring 9 is provided within the upper member 2 engaging at its lower end the orifice plate 3 and at its upper end a retaining disc 10. A stop-nut 11 is provided on the tube 7 to limit downward travel. Fluid from the chamber provided by the upper member 2 may pass through the tube 7 into the chamber by the lower member 5. At suitable points spaced circumferentially, the tube 7 is provided with a plurality of orifices 13, one of the orifices 13 being provided in alignment with each of the pairs of orifices 4 and 4*a*. The orifices 13 are designed to direct a stream of fluid radially of the head, meeting the intersections between the streams of fluid emerging from orifices 4 and 4*a* and assisting in breaking up the water in the desired fog or spray. The retaining disc 10 is held by a bolt 16 and may be provided with orifices 8 to facilitate the flow of fluid by the disc 10.

The lower chamber 5 has a frusto-conically shaped closure provided with a plurality of sets of orifices 14 arranged circumferentially on the frusto-conical closure, each set of orifices 14 including three orifices disposed angularly with each other and designed to form emerging streams of fluid which will intersect or impinge upon one another at a common point in advance of the orifices. The closure provides a guide for the bolt 16 and the bolt 16 is indicated as provided with a cap 15 which in operative position of the head closes the lower end of the head and prevents entrance of fumes, dust, etc. to the ports or orifices 14.

The device shown in Figures 1 and 2 of the drawings operates as follows: When no fluid pressure is applied to the device, the device is maintained in the position shown in Figure 1. For this purpose the spring 9, which is a compresion spring, operates by compression against the disc 10 to spring the cap 15 in position to engage the lower member 5 and move the lower member 5 into position where the orifice plates 3 and 6 are in contact, as indicated, with the respective shoulders of the lower members 2 and 5 contacting each other and thereby enclosing the orifices 4 and 4*a* from gas, fumes and dust which may be in the space surrounding the head. In a similar manner, as before pointed out, the cap 15 protects the orifices 14.

When the fluid pressure is applied the device moves toward the fully open position indicated in Fig. 2 the extent of movement depending upon the extent of fluid pressure applied to the device, the pressure of the water forcing the device to open being opposed by the force of the spring 9 so that the extent of opening of the device comes to equilibrium at any given fluid pressure. In the open positions of the device, two sources of fog or spray emerge from the distributor head, one being created by the set of impinging orifices 4 and 4a being directed mainly radially of the head, the other source being provided by the impinging orifices 14 and being directed at an axial direction downwardly from the head. When the orifices 13 are constructed as indicated, that is in the form of narrow vertical slots, in the partially open position of the device only a portion of the area of such orifices is open for the emergence of fluid radially through the ports 14 and this arrangement of orifices is found to be effective in allowing the device to automatically compensate for wide variations in fluid pressure back in the distributor head.

Figure 3:
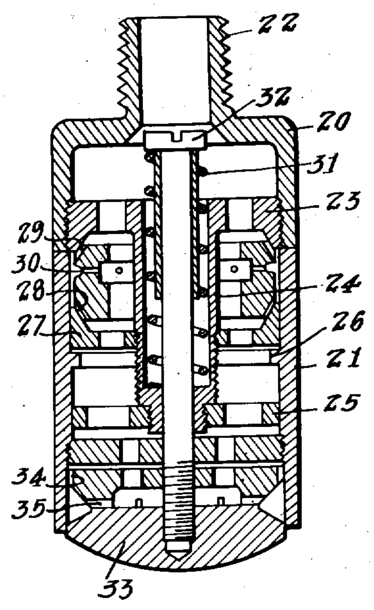
Figure 3 is a vertical section of a modified form of distributor head, showing the distributor head in the closed position.
Figure 4:
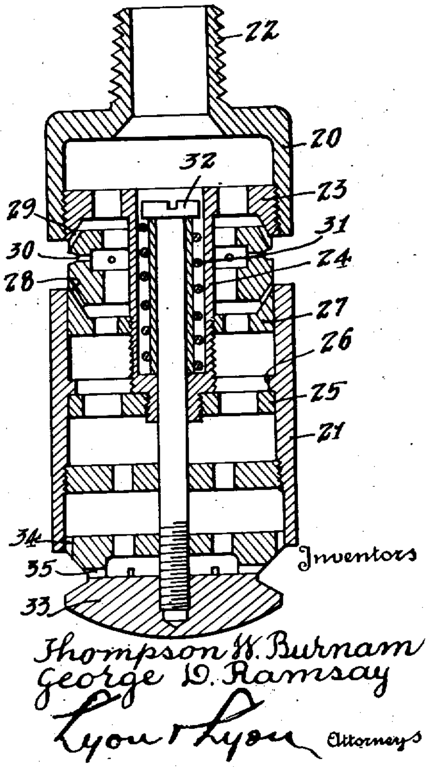
Figure 4 is a similar view, showing the distributor head in the fully open position.

Now referring to Figures 3 and 4 of the drawings, the distributor head there illustrated comprises an upper member 20 and a lower member 21, both members being generally hollow and of a general cylindrical shape, the upper member being provided with a threaded stem 22 for attachment to a source of fluid. The upper member is threaded at its lower end to an orifice ring 23, the interior of which is integral with the downwardly extending tube 24. The lower end of the tube 24 is threaded to an orifice guide plate 25 which provides a bearing on which the lower member 21 is mounted for axial movement. The lower member 21 is provided with a flange 26 which in the fully open position engages the guide plate 25 to limit the extent of opening of the device.

An orifice ring 27 is provided threaded to the tube 24 and in engagement with the lower conical surface of the ring 23. A plurality of sets of orifices or ports are provided, the sets being spaced circumferentially of the device and each set consisting of an orifice 28, the upper end of the ring 27 engaging the ring 24 and slot 29 which is slanted upwardly, and a radial orifice 30. Thus in operation of the device three streams of water emerge from the orifice 28, slot 29 and orifice 30 which impinge together to break the water up into a fog or spray. The space provided by the slot 29 in combination with the ring 23 for the discharge of fluid is identical with the space provided by one of the orifices 28 and directs the fluid at the same angle to the axis so that the streams of fluid emerging from the slots 29 and the orifices 28 are of like volume and will impinge together when the apparatus is in the position shown in Figure 4 to cause the water to be broken into a fog; at the same time the water flowing through radial orifice 30 impinges with the other two sets of streams.

The tube 24 receives a coil spring 31 which engages the head of a bolt 32, the lower end of which is threaded to a head 33. The head 33 is provided with a circumferential series of radial orifices 34 and with cylindrical slots 35 which, together with the contiguous parts of the lower member 21, forms an orifice. The orifices thus formed by the slots 35 and the orifices 34 in operation provide impinging streams of water.

In operation the spring 31, in absence of water pressure, draws the head 33 upwardly until the orifices provided on said head are enclosed within the member 21. It likewise draws together the upper and lower members 20 and 21.

Figure 5:
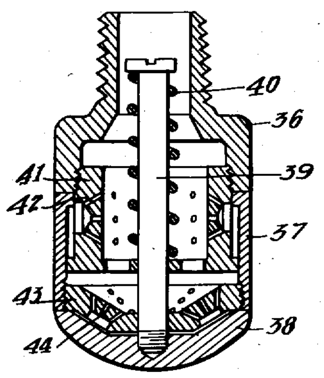
Figure 5 is a vertical section of a modified form of the distributor head in closed position.
Figure 6:
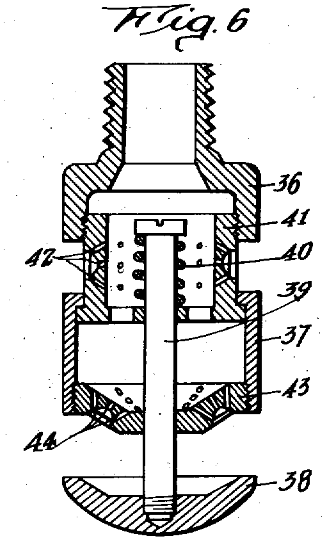
Figure 6 is a similar view of the distributor head in the open position.

Now referring to Figures 5 and 6 of the drawings, we have shown another modified form of the invention which includes an upper member 36, a lower member 37, and a closure cap 38. The closure cap 38 is mounted on a bolt 39 which is yieldingly urged upwardly by a spring 40. At the lower end of the upper member 36 is threaded an orifice ring 41 which provides a circumferential series of orifices 42, each set of orifices consisting of a central, radially disposed orifice and forwardly and downwardly angled orifices, and a lower forwardly angled orifice, as indicated. The orifice ring 41 provides a guide on which the bolt 39 is mounted and also a guide retaining flange for the lower member 37. The lower member 37 has an orifice plate 43 having a plurality of sets of circumferentially arranged orifices 44 similar to the orifices 42 but directed mainly downwardly. The cap 38 is adapted, in the closed position, to cover the orifices 44.

The particular forms of the orifice indicated in this form of the invention readily adapt themselves to a variety of designs which will permit any desired pattern or density of fog to be obtained.

Figure 7:
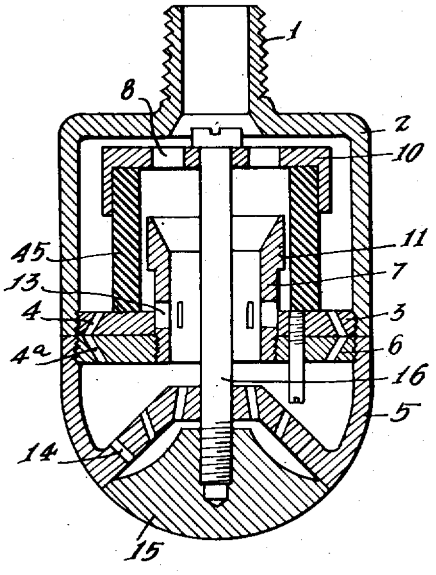
Figure 7 is an elevation of a further modified form of the invention in closed position.
Figure 8:
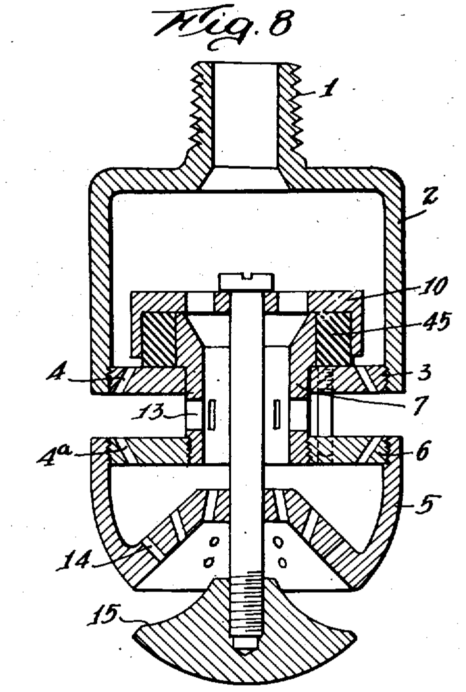
Figure 8 is a similar view in the fully open position.

Now referring to Figures 7 and 8 of the drawings, we have shown a distributor head substantially similar to that shown in Figure 1 of the drawings, with the exception that in Figures 7 and 8 there is indicated an annular ring 45 made of an elastic material, such as rubber, used in substitution for the coil spring 9 in the distributor head illustrated in Figures 1 and 2.

Figure 9:
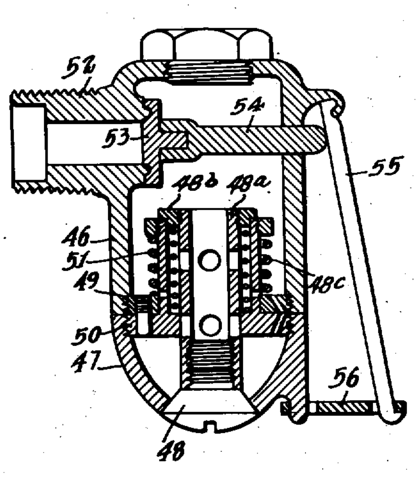
Figure 9 is an elevation mainly in section of a modified form of the apparatus, employing a fusible link.

Now deferring to Figure 9 of the drawing, we have illustrated the modified form of distributor head particularly arranged in order to incorporate a novel form of automatic fusible link actuating mechanism. As indicated in Figure 9, the body of the head is provided in two separate parts, an upper part 46 and a lower part 47, and there is provided a closure cap 48. The upper and lower parts have orifice plates 49 and 50 at their meeting faces, in which are provided the orifices to form the desired spray pattern from the distributor head. A coil spring 51 is indicated for the purpose of supporting the opening of the device under influence of the fluid pressure. The closure cap 48 is threaded to a hollow tube 48a having a retaining ring 48b which is engaged by a spring 48c for yieldingly urging the cap 48 to a closed position. The upper member 46 is indicated as having a laterally extending threaded connection 52 by means of which connection may be made to a source of fluid pressure. This connection is closed by a valve head 53 held against its seat by a link 54, which link extends through an opening in the member 46 and exteriorly of the member is in engagement with a loose link 55 which locks the valve head 53 in the closed position. The link 55 at its lower end is engaged by a fusible link 56. When a fire occurs, it melts the fusible links 56, links 55 and 54 are loosened, allowing the cap 53 to be forced from its seat on the valve, and the fluid pressure then enters the device, bringing the parts to the operating position.

Figure 10:
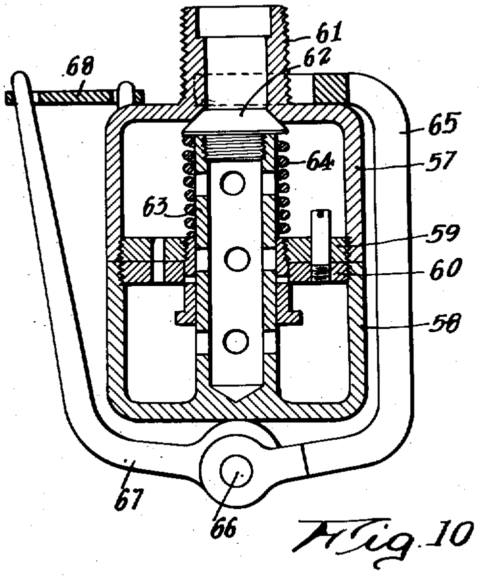
Figure 10 is a similar view showing another form of the apparatus employing a different form of fusible link.

Now referring to Figure 10, we have indicated another modification of the fusible link and the distributor head of our invention. In this form of the invention the distributor head is indicated as having an upper portion 57 and a lower portion 58 which meet together and between which are provided the orifice plates 59 and 60 which contain the orifices which generate the fog or spray on opening of the device. In this form of the invention the upper member is provided with a threaded stem 61 for connecting the head to a source of fluid pressure, and a valve member 62 is provided for closing the stem 61. The valve member 62 is threaded to an annular tube 63 extending from the lower member 58. It is yieldingly urged to the closed position by the spring 64 which also serves to yieldingly urge members 57 and 58 into the closed position. In this form of the device the fluid pressure against the seat 62 is sufficient to open the device but for the fusible link assembly which includes the yoke 65 pivoted at 66 to an arm 67. The yoke 65 engages the upper face of the member 57 with pivot point 66 and the linkage engages the lower face of the head; a fusible link 68 is attached to the upper member 57 and the arm 67. When a fire occurs, the rise in temperature causes the fusible link 68 to fail and the arms and yoke drop downwardly under the influence of the fluid pressure on valve member 62, permitting the operation of the device.

Figure 11:
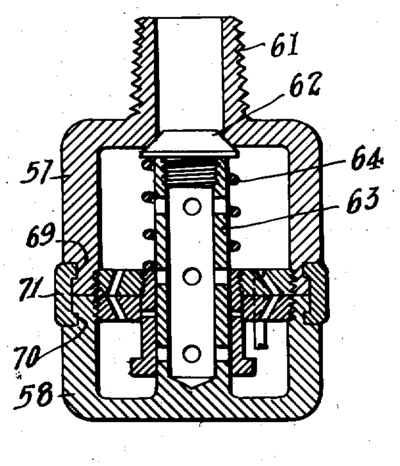
Figure 11 is an elevation mainly in section of a further modified form of the device, using a fusible band in the closed position.
Figure 12:
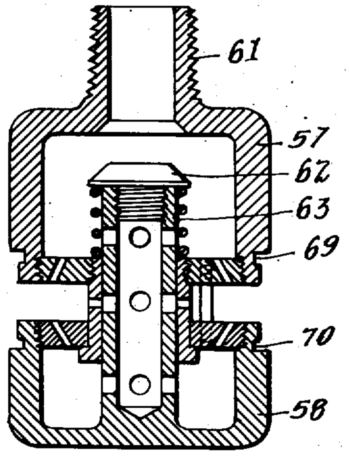
Figure 12 is a similar view, in the open position.

Another modification of the distributor head using the fusible links is shown in Figures 11 and 12. In these figures the distributor head per se may, if desired, be identical with that shown in Figure 10 except that suitable recesses 69 and 70 are provided in the upper member 57 and lower member 58, respectively, to receive a cast fusible band 71. The grooves 69 and 70 are entirely filled by the cast band made of a suitable metallic alloy which, when heated, will rupture and permit the device to open in the manner previously described.

Figure 13:
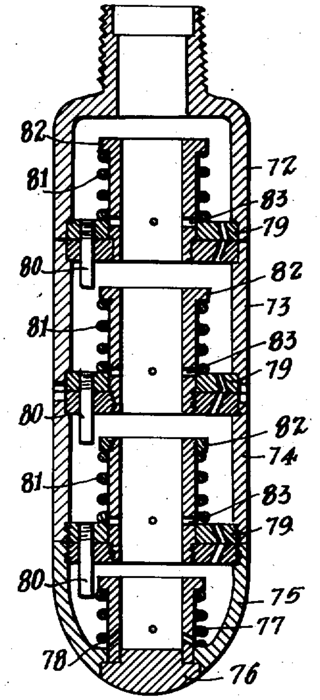
Figure 13 is an elevation of a modified form of the invention, allowing for a multiple opening.

Now referring to Figure 13, we have illustrated the distributor head of the present invention arranged to provide a multiplicity of separately acting fog-creating means. As indicated in the figure, the device comprises four separately movable members 72, 73, 74 and 75, in addition to the separately movable lower member 76. The lower member 76 is normally held closed by compression spring 77 and has orifices 78 through which fluid may be distributed outwardly and downwardly on the opening of the cap 76. Between each pair of the members 72–75, inclusive, are provided orifice plates generally indicated at 79, containing orifices for forming impinging streams. These plates are dowelled together for guiding purposes, as by dowels 80, and springs 81 are indicated for normally closing the respective members. The spring acts on the tube 82 which may contain the radial port 83 which in the open position cooperates with the ports in the plate 79, forming the fog or spray pattern.

With the device as indicated when water pressure is applied there will be separation between members 72 and 73 for disclosing one series of fog to jet-generating means, a separation between the members 73 and 74 for allowing the operation of another set of fog or spray-generating means, and an opening between parts 74 and 75 for permitting the operation of the still further set of fog or spray-generating means.

Figure 14:
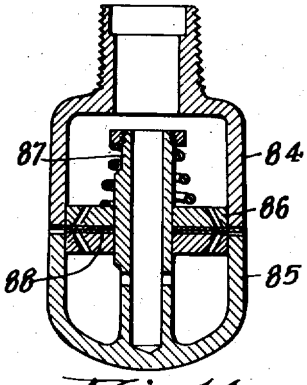
Figure 14 is an elevation in section of a modified form of the apparatus employing a resilient washer.
Figure 16:
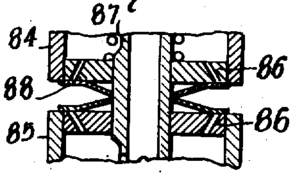
Figure 16 is a plan view of one of the washers.
Figure 15:
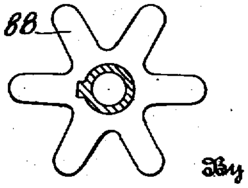
Figure 15 is a fragmentary section of the device in the open position.

In Figure 14 we have shown a modified form of distributor head in which the means are mainly characterized by the inclusion of a resilient washer for cooperation with the orifices in forming the fog or spray operations. As indicated in Figures 14, 15 and 16, the distributor head consists of relatively movable members 84 and 85 having at their meeting faces an orifice plate 86 and having the usual spring-actuated means 87 for closing the members 84 and 85. In this form of the apparatus there is added star-shaped resilient washers 88 of flexible material, normally in the position indicated in Figure 15 but adapted to be collapsed in the position indicated in Figure 14 by the spring 87. The washers are star shaped so that when the fog or spray is discharged they have the effect of breaking up the spray into a star shaped particle. When the device opens, the washers 88 assume the position indicated in Figure 15 and control the pattern of the spray delivered from the head.

Figure 17:
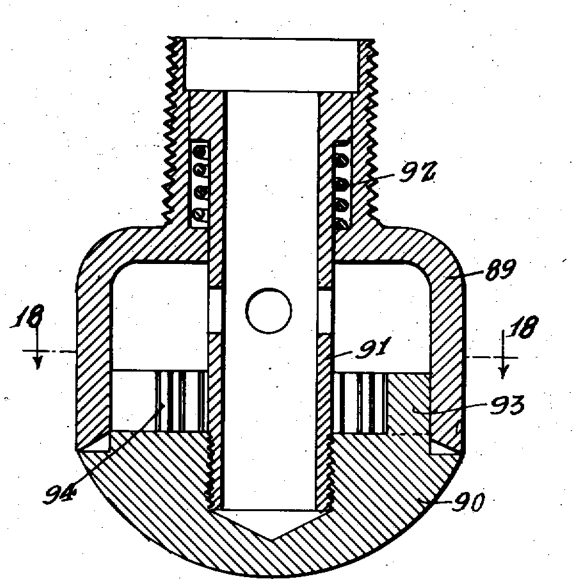
Figure 17 is an elevation of a modified form of the invention.
Figure 18:
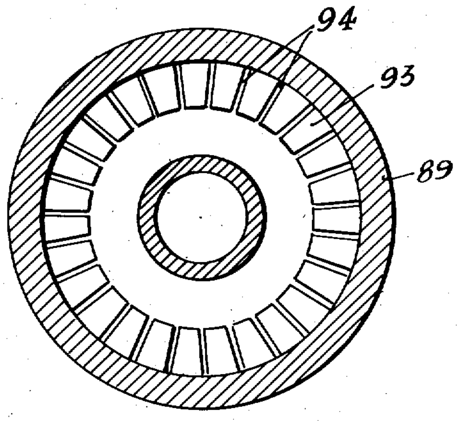
Figure 18 is a section on the line 18—18 of Fig. 17.

Now referring to Figures 17 and 18 of the drawings, these figures illustrate a distributor head of substantially the same type as previously indicated, that is, the head includes the upper member 89 and the lower member 90, the lower member being attached to a tube 91 which is urged upwardly by a spring 92. The lower member is provided with an orifice ring 93 which has a running fit with the lower, inside wall of the upper member 89. Extending radially through the ring 93 are provided slots 94. In the position of the device indicated in Figure 17, the entire area of the slot is closed by contact between the ring 93 and the lower, inside wall of the member 89 but as the members 89 and 90 separate under hydraulic pressure, a progressively increasing area of the slots 94 becomes exposed to the discharge of water, spray or fog. This form of the device provides a very simple means for varying the quantities of water supplied by the distributor head in accordance with the pressure back of the head.

Figure 19:
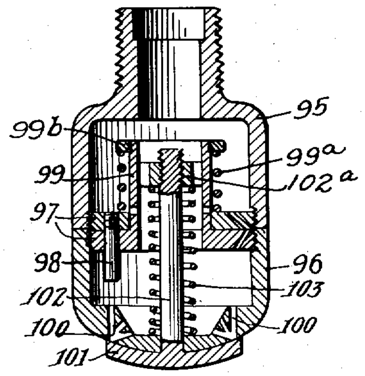
Figure 19 is an elevation in vertical section of a further modified form of the invention, illustrating the employment of independent resilient means for controlling different separating movements of the distributor head.

Now referring to Figure 19, the distributor head therein illustrated comprises the upper member 95 and the lower member 96. Between the members 95 and 96 are orifice plates 97 containing the orifices for generating the fog or spray pattern on opening of the device. The dowel 98 is intended for maintaining the orifices in proper circumferential alignment. For controlling the opening between members 95 and 96 there is provided the tube 99 connected with the lower member 96 and urged upwardly by the compression spring 99ª. The device also includes sets of orifices 100 at the lower end of the member 96 which are normally covered by a cap 101. The cap 101 is mounted on a bolt 102 guided within the tube 99 and urged to the closed position by a spring 103 independent of the spring 99ª. By separately adjusting the adjustment nut 99ᵇ connected to the springs 99ª and spider 102ª threaded to the stem 102 of cap 101 one may independently adjust the degree of opening of the device at its lower end as compared with the opening at its center.

Figure 20:
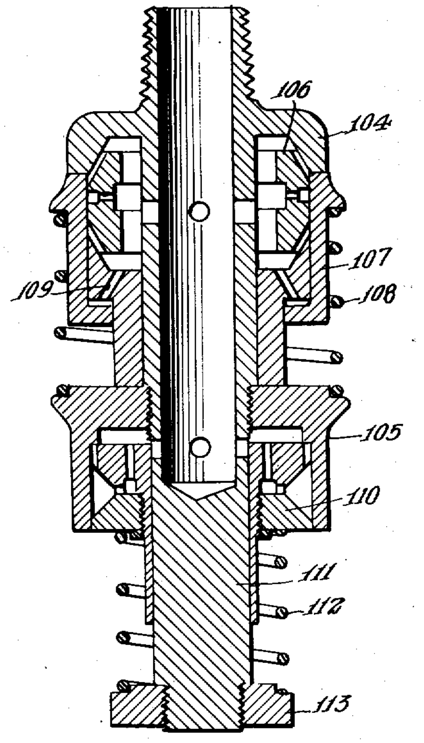
Figure 20 is an elevation mainly in section of a modified form of the device, using exterior springs for controlling the closing action.
Figure 21:
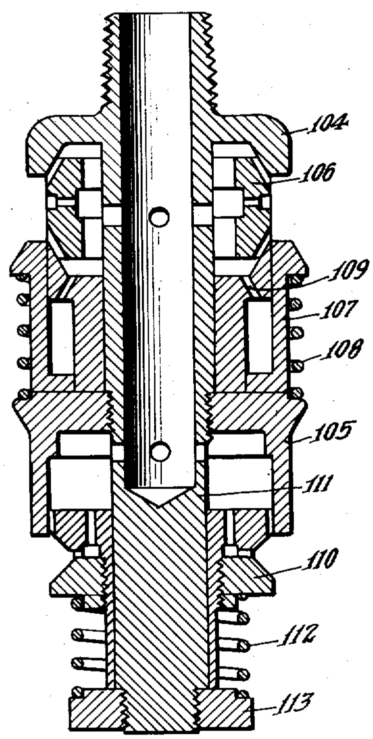
Figure 21 is a similar view of the device in the open position.

Referring to Figures 20 and 21, the device comprises an upper member 104 and a lower member 105. The upper member 104 is provided with an orifice bearing ring 106 for generation of the fog or spray pattern, which is adapted to be covered and uncovered by the movement of a movable sleeve 107. The movable sleeve 107 is normally urged into the closed position by a compression spring 108 and is adapted to be moved to the open position by fluid pressure applied to the interior of the sleeve through ports 109. The lower member 105 is threaded on an extension tube 111 of member 104 and has mounted therein a movable orifice containing ring 110 having orifices arranged in the open position to direct a fog or spray pattern downwardly or outwardly. The ring 110 is axially guided on a central tube 111 integral with the upper member 104 and is urged into the closed position by the exterior spring 112, the tension of which is adjustable by a nut 113 independently of the tension on the spring 108.

While the particular forms of the apparatus herein illustrated are well adapted to carry out the objects of the invention, it is to be understood that various changes and modifications may be made, and this invention includes the modifications and changes that come within the scope of the appended claims.

We claim:

1. A distributor head comprising two orifice members each having bores for discharging fluid in the form of a spray or fog, two relatively movable members movable from a closed position in which said orifice members are enclosed within said movable members to an open position, means yieldingly urging said movable members to the closed position, one orifice member being attached to one of said relatively movable members, the other orifice member being attached to the other relatively movable member so that said orifice members are moved apart as the relatively movable members are moved to the open position, the bores in said orifice being adapted to form impinging jets in the open position and means for directing fluid against said relatively movable members so that they are responsive to fluid applied to said distributing head for movement into the open position.

2. A distributor head which comprises two members mounted for relative axial movement to and from a closed position, an orifice member attached to each of the first two movable members and mounted to be covered by said movable members in their closed position and to be uncovered in the open position of said movable members, the orifice members thus being moved apart as the movable members move to the open position, each orifice member having a spray or fog-generating bore which is adapted to form a jet which impinges with the jet from the other orifice member, means for yieldingly maintaining the said relatively movable members in closed position, and means for directing the fluid pressure applied to said distributor head against said relatively movable members to effect opening of the same.

3. A distributor head comprising a first member and a second member movable relative to the first member to and from a closed position, orifice means mounted to be enclosed within said movable members in the closed position thereof and including a member attached to each movable member, each of the members of said orifice means having a bore for generating a fluid spray or fog to be emitted between said movable members in the open position thereof, the bores forming impinging jets in the open position of said movable members, a third member movable relative to said second member, orifice means mounted to be enclosed within said second and third movable members in the closed position thereof and having bores adapted for generating a fog or spray emitted between said second and third movable members in the open position thereof, means for yieldingly urging the first and second movable members to the closed position, means for independently yieldingly urging the second and third movable members to the closed position, and means for applying fluid pressure for urging said movable members into the open position.

4. A distributor head which comprises an upper chamber member, a lower chamber member, a central tube connected to one of said members interconnecting the chambers with said members and providing an axial guide for relative movement of said members, said members being movable from a closed to an open position, yielding means for urging the members to the closed position, the fluid chambers of said members being arranged so that the fluid pressure within said members urges the members to the open position, and two discharge control members positioned to be enclosed by said chamber members in the closed position and having bores for the discharge of fluid between said chamber members in the open position thereof, one control member being attached to one chamber member, the other control member being attached to the other chamber member, so that the control members are relatively movable with the movements of the chamber members, the bores of the control members being angularly related to form impinging jets in the open position of the chamber members.

5. A distributor head which comprises an upper chamber member, a lower chamber member, a central tube interconnecting the chambers within said member and providing an axial guide for relative movement of said members, said members being movable from a closed to an open position, yielding means for urging the members to the closed position, the fluid chambers of said members being arranged so that the fluid pressure within said members urges the members to the open position, and discharge control members positioned to be enclosed by said chamber members in the closed position and having bores for the discharge of fluid between said chamber members in the open position thereof, said discharge control members including circumferential series of cooperating sets of bores which sets of bores include an axial bore and two other bores angularly related thereto adapted to form impinging jets of fluid.

6. A distributor head for producing a fluid spray or fog, said distributor head including two members normally closed together to form a chamber but movable to an open position by pressure of fluid within said chamber, means within said chamber including a member attached to each of the movable members for the discharge of fluid in the form of a spray or fog, said latter members each including a bore angularly related relative to the bore of the other member and positioned to form impinging jets, the discharge area of the bores being independent of the position of the two relatively movable members.

THOMPSON W. BURNAM.
GEORGE D. RAMSAY.

REFERENCES CITED

The following references are of record in the file of this patent:

UNITED STATES PATENTS

| Number | Name | Date |
|---|---|---|
| 163,101 | Orr | May 11, 1875 |
| 945,867 | Richter | Jan. 11, 1910 |
| 1,981,909 | Bills et al. | Dec. 27, 1932 |
| 1,898,325 | Venn | Feb. 21, 1933 |
| 2,255,119 | Kennedy | Sept. 9, 1941 |
| 2,332,535 | Ross | Oct. 26, 1943 |
| 2,343,305 | Larter | Mar. 7, 1944 |
| 2,404,804 | Lee | July 30, 1946 |

FOREIGN PATENTS

| Number | Country | Date |
|---|---|---|
| 373,491 | Germany | Apr. 12, 1923 |

Certificate of Correction

Patent No. 2,568,429 September 18, 1951

THOMPSON W. BURNAM ET AL.

It is hereby certified that error appears in the printed specification of the above numbered patent requiring correction as follows:

Column 1, line 58, after "fluid" insert *from*; column 10, line 63, list of references cited, for the patent number "1,981,909" read *1,891,909*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*